US010970252B2

(12) United States Patent
Balachandran

(10) Patent No.: US 10,970,252 B2
(45) Date of Patent: Apr. 6, 2021

(54) METHOD AND APPARATUS FOR GENERATING CUSTOMIZED DIGITAL FILES WITH VARIABLE DATA

(71) Applicant: Sahadevan Balachandran, Bangalore (IN)

(72) Inventor: Sahadevan Balachandran, Bangalore (IN)

( * ) Notice: Subject to any disclaimer, the term of this patent is extended or adjusted under 35 U.S.C. 154(b) by 655 days.

(21) Appl. No.: 15/727,270

(22) Filed: Oct. 6, 2017

(65) Prior Publication Data

US 2019/0108236 A1 Apr. 11, 2019

(51) Int. Cl.
*G06F 16/17* (2019.01)
*G06F 16/58* (2019.01)
*G06F 16/438* (2019.01)
*G06F 16/11* (2019.01)
*G06F 16/16* (2019.01)

(52) U.S. Cl.
CPC .......... *G06F 16/173* (2019.01); *G06F 16/122* (2019.01); *G06F 16/168* (2019.01); *G06F 16/4393* (2019.01); *G06F 16/58* (2019.01)

(58) Field of Classification Search
None
See application file for complete search history.

(56) References Cited

U.S. PATENT DOCUMENTS

| 2002/0059278 | A1* | 5/2002 | Bailey | G06F 40/174 |
| 2002/0184233 | A1* | 12/2002 | Schneider | G06F 40/10 |
| 2005/0094206 | A1* | 5/2005 | Tonisson | G06F 40/103 |
| | | | | 358/1.18 |

OTHER PUBLICATIONS

Algorithms for hierarchical clustering: an overview; Fionn Murtagh; John Wiley & Sons; 2011; pp. 86-97 (Year: 2011).*

* cited by examiner

*Primary Examiner* — Mariela Reyes
*Assistant Examiner* — Jermaine A Mincey
(74) *Attorney, Agent, or Firm* — Munck Wilson Mandala; J. Chase Covello

(57) ABSTRACT

A method and apparatus for generating composite documents from document containers using a set of rules to populate slots in the containers with variable content is presented. The present invention allows the user to produce many individual, customized documents from a single container or set of linked containers and a set of content items stored in a database. Each container includes a set of rules that establish one-to-one, one-to-many, many-to-many, or circular mappings between slots and content items. In one or more embodiments, the present invention may be used to create customized composite photograph collages, such as custom school pictures, where each generated document is a photograph collage that features a photograph of an individual student in a central, enlarged, or more prominent position, with smaller photographs of the other students in the class or school in less prominent positions in the collage.

17 Claims, 8 Drawing Sheets

METHOD AND APPARATUS FOR GENERATING CUSTOMIZED DIGITAL FILES WITH VARIABLE DATA

BACKGROUND OF THE INVENTION

(1) Field of the Invention

The present invention relates generally to methods for variable-data publishing and document creation, and more particularly to a method and apparatus for generating composite documents from user-defined document containers or templates using user-defined rules to populate the document containers or templates with digital resources stored in a database.

(2) Description of the Related Art

Variable-data publishing (also known as "variable-data printing" or "database publishing") is a technique for producing a set of electronic or printed documents from a template wherein some of the document content dynamically changes from one document to the next, while other document content remains unchanged. The template contains the unchanging ("static") document content along with information that defines where and how the changing ("variable") content should appear. The variable content may be text, images, or other data, and such data is commonly stored in a computer database management system. Variable-data publishing allows a user to create and maintain large numbers of documents in an automated fashion, and to quickly and easily update every document when changes are made to the template, the variable content, or both.

Examples of prior art variable-data publishing include "mail merge" functionality in word-processing software, which allows the user to generate a set of personalized letters each addressed to a different recipient, as is commonly used in newsletters, advertising, invoicing, and product recall notifications, amongst others. Other examples of variable-data publishing include web content management systems ("CMS"), which are used by web sites to present news articles, blog posts, images, videos, and other content with a consistent appearance and behavior that is shared across all the content on the web site.

Prior art variable-data publishing techniques are typically used for one-to-one mapping between each variable data item and its corresponding individual document, but do not allow for more complex relationships between variable data and documents. For example, prior art variable-data publishing techniques do not allow for one-to-many or many-to-many mapping of variable data items to sets of documents. Further, prior art variable-data publishing techniques do not allow for circular mapping where each variable data item appears in a defined position in one document, but appears in a set with other variable data items in the remaining documents, thereby producing a set of documents where the variable data items cycle through the defined position but otherwise appear in a common "pool" of data items.

BRIEF SUMMARY OF THE INVENTION

A method and apparatus for generating composite documents from document containers or templates ("containers") using a set of rules to populate the containers with variable content is presented. In one or more embodiments, the method and apparatus of the present invention allows the user to produce many individual, customized documents from a single container or set of linked containers and a set of content items stored in a database. In one or more embodiments, each container includes information that defines the locations and contents of unchanging document content ("static content items") and/or information that defines rules for the selection and placement of changing document content ("variable content items"). Multiple "data levels" of variable content items may be defined in a hierarchical fashion, such that variable content items at higher data levels in the hierarchy may remain unchanged, while variable content items at lower data levels may change in particular subsets of customized documents. Thus, the method and apparatus of the present invention generates documents by processing the definitions and rules in each container and subsequently populating each container with static content items and variable content items (collectively, "content items").

In one or more embodiments, the method and apparatus of the present invention may be used to create customized composite photograph collages, such as custom school pictures, where each generated document is a photograph collage that features a photograph of an individual student in a central, enlarged, or more prominent position, with smaller photographs of the other students in the class or school in less prominent positions in the collage. Thus, each student receives a unique school picture in which that student appears more prominently than the other students. Similarly, the method and apparatus of the present invention may be used to create other types of customized composite photograph collages, such as workplace, vacation, or special event pictures, where each individual in the picture receives a unique picture featuring that individual. In one or more embodiments, the method and apparatus of the present invention may be used to create other types of customized documents, such as identification cards, photo books, marketing brochures or flyers, or targeted marketing letters or emails, among others.

In one or more embodiments, each container defines locations, called "slots", where content items may appear. Content items are placed in slots by a set of rules associated with or defined by the container. In the case of static content items, the rule is that a static content item slot is associated with a single static content item, which appears unchanged in the static content item slot across all documents generated with the container (i.e., a one-to-one mapping between slots and static content items). For example, in a custom school picture, one or more static content item slots may be used for a picture of the school, an image of the school's logo or mascot, a picture of the school principal, and/or text displaying the name of the school, because those content items appear the same in each customized picture.

Rules may be more complex for variable content items. In one or more embodiments, each rule or set of rules may define a one-to-many mapping between a slot and a collection of variable content items. In one or more embodiments, a variable content item slot may include a rule that, for each separate generated document, selects a single variable content item from the collection of variable content items (for example, a collection of variable content items stored in a database) and places the selected variable content item in the slot. Thus, a separate document may be generated for each separate variable content item in the collection, with each document having a unique variable content item occupying the slot. For example, in a custom school picture, a variable content item slot may be used for the most prominent student picture position, because each generated document features a different student in the most prominent position.

In one or more embodiments, multiple data levels of variable content item slots may be defined in a hierarchical fashion, such that variable content item slots at higher data levels in the hierarchy may retain the same data for a particular subset of customized documents, while variable content item slots at lower data levels may change within that subset of documents. For example, suppose a user has multiple addresses on file for each of several different people and wishes to generate a separate letter to be sent to each person at each such address on file. A simple two-level hierarchy may define a single "top-level" variable content item slot for the person's name and a "bottom-level" variable content item slot for the address. For each separate person, a set of letters may be generated by keeping the top-level name slot unchanged while changing the bottom-level address slot for each separate letter. For example, if there are three people and person 1 has two addresses, person 2 has three addresses, and person 3 has one address, 2+3+1=6 separate letters will be generated: two for person 1, three for person 2, and one for person 3.

In one or more embodiments, multiple data levels of variable content item slots may be defined for custom school pictures. For example, in a custom school picture, a school may have several classes, each class having several sections, and each section having a different teacher. When generating a set of custom school pictures for all the students in a school, the same teacher should appear in each custom picture for each student in a given section. In one or more embodiments, a variable content item slot may be used for a picture of the section teacher, and the slot may include a rule that, for each generated document in the same section, selects the picture of the corresponding section teacher from a collection of all teacher pictures and places the selected section teacher picture in the slot. Thus, the picture of the teacher remains the same for each student in the same section's custom school picture, but the picture of the teacher changes for other students' custom school pictures in other sections and classes.

In one or more embodiments, multiple data levels of variable content item slots may be defined for other types of documents, such as brochures for a marketing campaign. For example, a marketing campaign may be divided into geographical areas, each area having several different products with different promotional rates, and each product having a set of consumer occupations and income ranges to which the product is targeted. When generating a set of marketing brochures, each consumer should receive a brochure targeted to the correct occupation and income range, products and promotional rates, and geographical area. Thus, in one or more embodiments, there may be variable content item slot data levels for "occupation and income range", "products and promotional rates", and "geographical area".

In one or more embodiments, each rule or set of rules may define a many-to-many mapping between slots and a collection of variable content items. In one or more embodiments, a set of variable content item slots may include a set of rules that, for each separate generated document, selects a set of variable content items from the collection of variable content items (for example, a collection of variable content items stored in a database) and places one of the selected variable content items in each of the slots. For example, in a custom school picture, a set of variable content item slots may be used for the collection of all student pictures, and each slot may be assigned a picture of one the students in the collection.

In one or more embodiments, each rule or set of rules may define a circular mapping between slots and a collection of variable content items. In a circular mapping, the container has a special "main" slot and a set of one or more "alternate" slots, such that the total number of "main" and "alternate" slots is equal to the total number of variable content items in the collection. In one or more embodiments, the main slot may appear larger than the other slots and may be placed in a central or more prominent position in the container, while the other slots appear smaller and in less prominent positions in the container. The collection of variable data items is configured to appear in the combination of the main slot and other slots such that each unique variable content item appears in the main slot in one generated document, but the same variable content item appears in one of the other slots alongside the other variable data items in the remaining generated documents. Therefore, in one or more embodiments, the method and apparatus of the present invention produces a set of documents where the variable content items appear to cycle one by one through the main slot, and when a variable content item is not in the main slot, it appears in a common "pool" of slots alongside the other variable content items in the collection. Circular mapping thus shares some of the characteristics of one-to-many mapping (a separate document is generated for each separate variable content item in the collection, with each document having a unique variable content item occupying the "main" slot), and some of the characteristics of many-to-many mapping (each document has a unique subset of the remaining "non-main" variable content items occupying the "alternate" slots).

In one or more embodiments, the method and apparatus of the present invention may be implemented as computer-readable instructions in a computer system having a processor, a memory, and optionally one or more input and output devices (such as disk storage, network interfaces, cameras, scanners, printers, or other devices). In one or more embodiments, the computer-readable instructions may implement a database management system (for example, a relational database, an object-oriented database, a hierarchical database, a flat file database, or any other type of data storage and retrieval system) to store variable content items, containers, or both. In one or more embodiments, the computer-readable instructions may implement the steps of retrieving a container from storage (for example, from the database, the memory, or an input device), reading the container to determine the locations and definitions of static content items and the rules for selection and placement of variable content items (including child containers, if any), retrieving the variable content items from storage, placing the static content items and variable content items into their defined locations in the container, recursively processing the child containers, if any, rendering the combination of container and content items as a document, and storing the document in memory and writing the document to an output device. In one or more embodiments, the document may be rendered in a digital image format, such as JPEG or TIFF, a document interchange format, such as PDF, PostScript, HTML, XML, or plain text, a document editing format, such as Microsoft Word or PowerPoint, a digital video format, such as MPEG, or any other document format.

BRIEF DESCRIPTION OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION OF THE INVENTION

Figure 1:
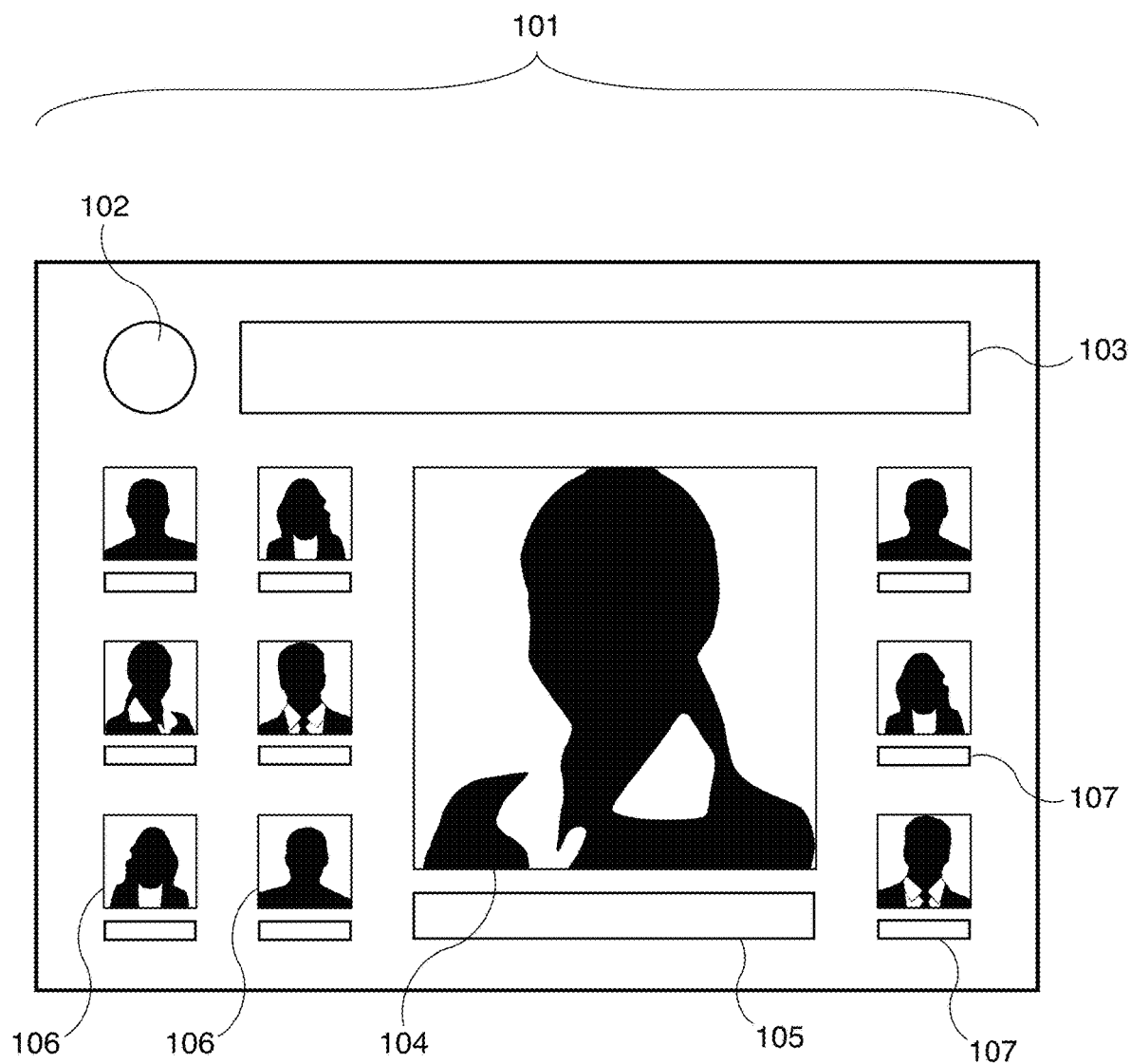
FIG. 1 shows the layout of a composite document according to an embodiment of the present invention.

A method and apparatus for generating composite documents from document containers or templates ("containers") using a set of rules to populate the containers with variable content is presented. In one or more embodiments, the method and apparatus of the present invention allows the user to produce many individual, customized documents from a single container or set of linked containers and a set of content items stored in a database. In one or more embodiments, each container includes information that defines the locations and contents of unchanging document content ("static content items") and information that defines rules for the selection and placement of changing document content ("variable content items"). Multiple "data levels" of variable content items may be defined in a hierarchical fashion, such that variable content items at higher data levels in the hierarchy may remain unchanged, while variable content items at lower data levels may change in particular subsets of customized documents. Thus, the method and apparatus of the present invention generates documents by processing the definitions and rules in each container and subsequently populating each container with static content items and variable content items (collectively, "content items").

In one or more embodiments, the method and apparatus of the present invention may be used to create customized composite photograph collages, such as custom school pictures, where each generated document is a photograph collage that features a photograph of an individual student in a central, enlarged, or more prominent position, with smaller photographs of the other students in the class or school in less prominent positions in the collage. Thus, each student receives a unique school picture in which that student appears more prominently than the other students. Similarly, the method and apparatus of the present invention may be used to create other types of customized composite photograph collages, such as workplace, vacation, or special event pictures, where each individual in the picture receives a unique picture featuring that individual. In one or more embodiments, the method and apparatus of the present invention may be used to create other types of customized documents, such as identification cards, photo books, marketing brochures or flyers, or targeted marketing letters or emails, among others.

In one or more embodiments, each container defines locations, called "slots", where content items may appear. Content items are placed in slots by a set of rules associated with or defined by the container. In the case of static content items, the rule that a static content item slot is associated with a single static content item, which appears unchanged in the static content item slot across all documents generated with the container (i.e., a one-to-one mapping between slots and static content items). For example, in a custom school picture, one or more static content item slots may be used for a picture of the school, an image of the school's logo or mascot, a picture of the school principal, and/or text displaying the name of the school, because those content items appear the same in each customized picture.

Rules may be more complex for variable content items. In one or more embodiments, each rule or set of rules may define a one-to-many mapping between a slot and a collection of variable content items. In one or more embodiments, a variable content item slot may include a rule that, for each separate generated document, selects a single variable content item from the collection of variable content items (for example, a collection of variable content items stored in a database) and places the selected variable content item in the slot. Thus, a separate document may be generated for each separate variable content item in the collection, with each document having a unique variable content item occupying the slot. For example, in a custom school picture, a variable content item slot may be used for the most prominent student picture position, because each generated document features a different student in the most prominent position.

In one or more embodiments, multiple data levels of variable content item slots may be defined in a hierarchical fashion, such that variable content item slots at higher data levels in the hierarchy may retain the same data for a particular subset of customized documents, while variable content item slots at lower data levels may change within that subset of documents. For example, suppose a user has multiple addresses on file for each of several different people and wishes to generate a separate letter to be sent to each person at each such address on file. A simple two-level hierarchy may define a single "top-level" variable content item slot for the person's name and a "bottom-level" variable content item slot for the address. For each separate person, a set of letters may be generated by keeping the top-level name slot unchanged while changing the bottom-level address slot for each separate letter. For example, if there are three people and person 1 has two addresses, person 2 has three addresses, and person 3 has one address, 2+3+1=6 separate letters will be generated: two for person 1, three for person 2, and one for person 3.

In one or more embodiments, multiple data levels of variable content item slots may be defined for custom school pictures. For example, in a custom school picture, a school may have several classes, each class having several sections, and each section having a different teacher. When generating a set of custom school pictures for all the students in a school, the same teacher should appear in each custom picture for each student in a given section. In one or more embodiments, a variable content item slot may be used for a picture of the section teacher, and the slot may include a rule that, for each generated document in the same section, selects the picture of the corresponding section teacher from a collection of all teacher pictures and places the selected section teacher picture in the slot. Thus, the picture of the teacher remains the same for each student in the same section's custom school picture, but the picture of the teacher changes for other students' custom school pictures in other sections and classes.

In one or more embodiments, multiple data levels of variable content item slots may be defined for other types of documents, such as brochures for a marketing campaign. For example, a marketing campaign may be divided into geographical areas, each area having several different products with different promotional rates, and each product having a set of consumer occupations and income ranges to which the product is targeted. When generating a set of marketing brochures, each consumer should receive a brochure targeted to the correct occupation and income range, products and promotional rates, and geographical area. Thus, in one or more embodiments, there may be variable content item slot data levels for "occupation and income range", "products and promotional rates", and "geographical area".

In one or more embodiments, each rule or set of rules may define a many-to-many mapping between slots and a collection of variable content items. In one or more embodiments, a set of variable content item slots may include a set of rules that, for each separate generated document, selects a set of variable content items from the collection of variable content items (for example, a collection of variable content items stored in a database) and places one of the selected variable content items in each of the slots. For example, in a custom school picture, a set of variable content item slots may be used for the collection of all student pictures, and each slot may be assigned a picture of one the students in the collection.

In one or more embodiments, each rule or set of rules may define a circular mapping between slots and a collection of variable content items. In a circular mapping, the container has a special "main" slot and a set of one or more "alternate" slots, such that the total number of "main" and "alternate" slots is equal to the total number of variable content items in the collection. In one or more embodiments, the main slot may appear larger than the other slots and may be placed in a central or more prominent position in the container, while the other slots appear smaller and in less prominent positions in the container. The collection of variable data items is configured to appear in the combination of the main slot and other slots such that each unique variable content item appears in the main slot in one generated document, but the same variable content item appears in one of the other slots alongside the other variable data items in the remaining generated documents. Therefore, in one or more embodiments, the method and apparatus of the present invention produces a set of documents where the variable content items appear to cycle one by one through the main slot, and when a variable content item is not in the main slot, it appears in a common "pool" of slots alongside the other variable content items in the collection. Circular mapping thus shares some of the characteristics of one-to-many mapping (a separate document is generated for each separate variable content item in the collection, with each document having a unique variable content item occupying the "main" slot), and some of the characteristics of many-to-many mapping (each document has a unique subset of the remaining "non-main" variable content items occupying the "alternate" slots).

In one or more embodiments, the method and apparatus of the present invention may be implemented as computer-readable instructions in a computer system having a processor, a memory, and optionally one or more input and/or output devices (such as disk storage, network interfaces, cameras, scanners, printers, or other devices). In one or more embodiments, the computer-readable instructions may implement a database management system (for example, a relational database, an object-oriented database, a hierarchical database, a flat file database, or any other type of data storage and retrieval system) to store variable content items, containers, or both. In one or more embodiments, the computer-readable instructions may implement the steps of retrieving a container from storage (for example, from the database, the memory, or an input device), reading the container to determine the locations and definitions of static content items and the rules for selection and placement of variable content items (including child containers, if any), retrieving the variable content items from storage, placing the static content items and variable content items into their defined locations in the container, recursively processing the child containers, if any, rendering the combination of container and content items as a document, and storing the document in memory and/or writing the document to an output device. In one or more embodiments, the document may be rendered in a digital image format, such as JPEG or TIFF, a document interchange format, such as PDF, PostScript, HTML, XML, or plain text, a document editing format, such as Microsoft Word or PowerPoint, a digital video format, such as MPEG, or any other document format.

FIG. 1 shows the layout of a composite document container 101 according to an embodiment of the present invention. In the embodiment of FIG. 1, container 101 comprises static content item slots 102 and 103 and variable content item slots 104, 105, 106, and 107. In one or more embodiments, container 101 defines the layout and appearance of a custom school photograph. In the embodiment of FIG. 1, static content item slot 102 is a placeholder for a digital image, which may, for example, be the school's logo or a photograph of the school, and static content item slot 103 is a placeholder for text, which may, for example, be the name of the school. Content item slots 102 and 103 are static content item slots because the school image and school name appear unchanged in each custom school photograph generated by the invention.

In the embodiment of FIG. 1, variable content item slots 104 and 106 are placeholders for digital images, which may, for example, be photographs of the students that appear in a custom school photograph. Variable content item slots 105 and 107 are placeholders for text, which may, for example, be the names of the students whose photographs appear in variable content item slots 104 and 106. In the embodiment of FIG. 1, variable content item slot 104 is larger than variable content item slots 106 and variable content item slot 104 appears in a central or more prominent position in container 101 than variable content item slots 106. Content item slots 104, 105, 106, and 107 are variable content item slots because the student photographs and student names change from one custom school photograph to the next. For example, variable content item slots 104 and 105 may show a different student photograph and student name in each custom school photograph generated by the invention.

In the embodiment of FIG. 1, variable content item slots 104 and 105 are designated as "main" slots and variable content item slots 106 and 107 are designated as "alternate" slots for use with the circular mapping described above. In one or more embodiments, a separate document may be generated for each separate student such that in each separate document, that student's photograph and name appear in variable content item slots 104 and 105 and the remaining students' photographs and names appear in variable content item slots 106 and 107. Thus, the students' names and pictures appear to cycle through variable content item slots 104 and 105 to generate a set of personalized photographs, each featuring one of the students.

Figure 2:
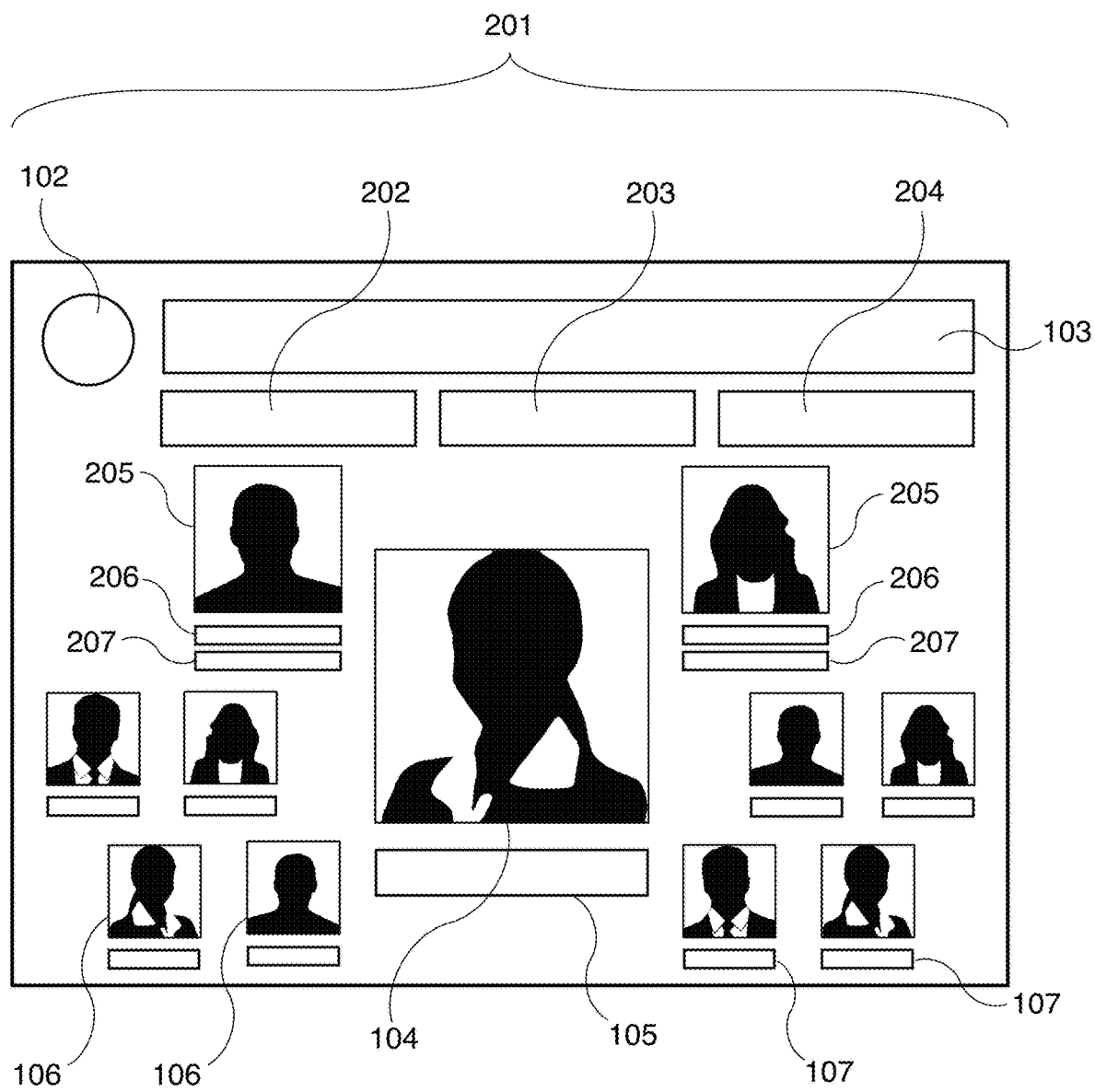
FIG. 2 shows the layout of a composite document according to an embodiment of the present invention.

FIG. 2 shows the layout of a composite document container 201 according to an embodiment of the present invention. In the embodiment of FIG. 2, container 201 is similar to container 101, but further comprises static content item slot 204 and variable content item slots 202, 203, 205, 206, and 207. In the embodiment of FIG. 2, container 201 includes variable content item slots having multiple data levels. In one or more embodiments, container 201 defines the layout and appearance of a custom school photograph.

In the embodiment of FIG. 2, static content item slot 204 is a placeholder for text, which may, for example, be the class year of the school photograph (for example, "2017-2018"). Content item slot 204 is a static content item slot because the class year appears unchanged in each custom school photograph generated by the invention.

In the embodiment of FIG. 2, variable content item slots 202 and 203 are placeholders for text, which may, for example, be the name of a particular class and section of students at the school. Variable content item slot 205 is a placeholder for a digital image, which may, for example, be a photograph of the class or section teacher, assistant teacher, school principal, or other school official. Variable content item slot 206 is a placeholder for text, which may, for example, be the name of the teacher or other school official whose photograph appears in variable content item slot 205. Variable content item slot 207 is a placeholder for text, which may, for example, be the title of the teacher, assistant teacher, school principal, or other school official whose photograph appears in variable content item slot 205. Content item slots 202, 203, 205, 206, and 207 are variable content item slots because the class and section names, teacher photograph, teacher name, and teacher title may change from one set of custom school photographs to the next.

In the embodiment of FIG. 2, there are multiple data levels of variable content item slots to accommodate the hierarchical organization of the school. Slots 104, 105, 106, and 107 (the photos and names of students) are assigned to the "student" data level because the contents of those slots change for each student's customized school picture. Slots 203, 205, 206, and 207 (the name of the section, as well as the photos and names of teachers or other school officials) are assigned to the "section" data level because the contents of those slots remain the same for each customized school picture in the same section but change from one section to the next. Slot 202 (the name of the class) is assigned to the "class" data level because the content of that slot remains the same for each customized school picture in the same class but change from one class to the next.

Figure 3:
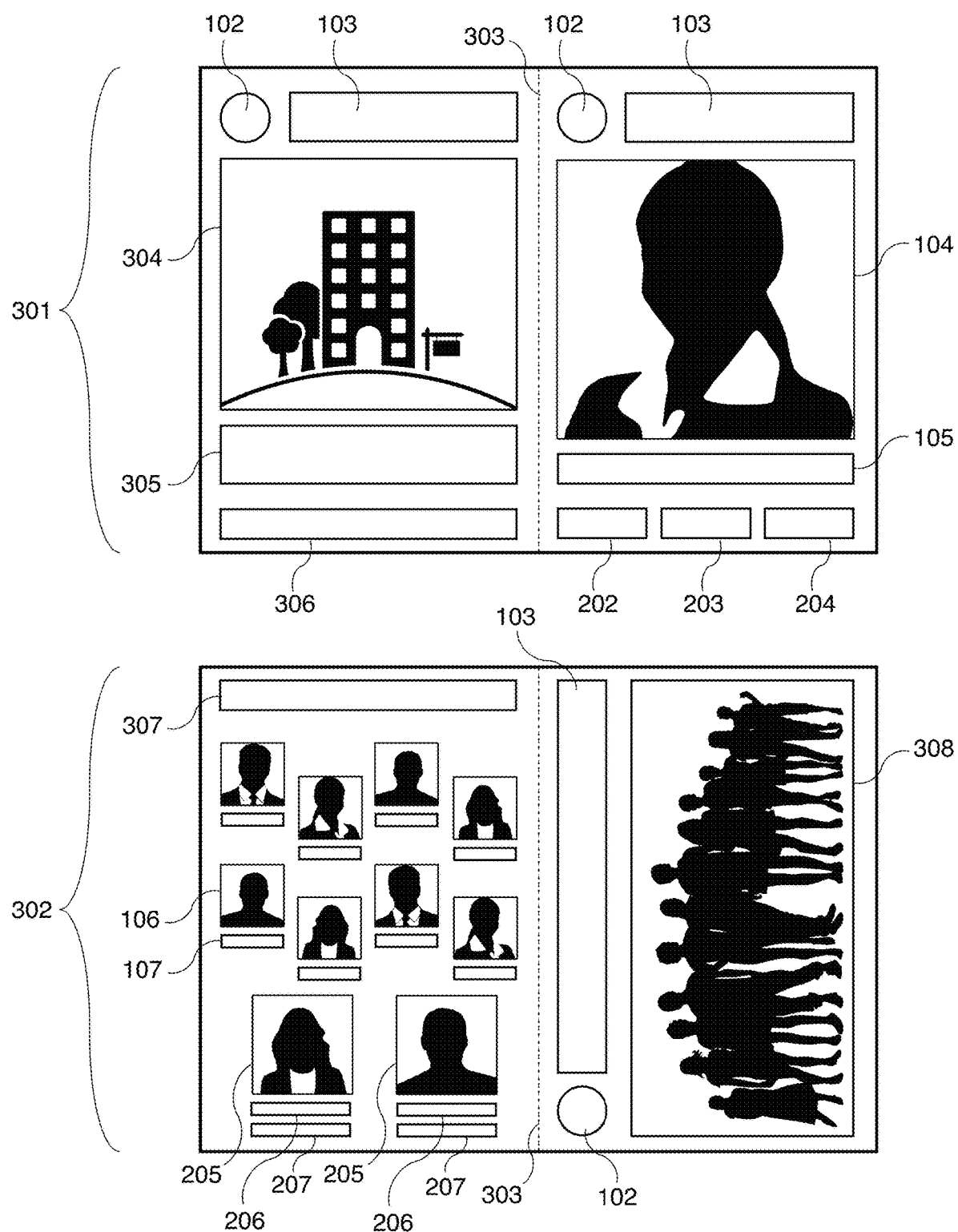
FIG. 3 shows the layout of a pair of linked composite documents according to an embodiment of the present invention.

FIG. 3 shows the layout of a pair of linked composite document containers 301 and 302 according to an embodiment of the present invention. In the embodiment of FIG. 3, containers 301 and 302 are similar to containers 101 and 201, but further comprise static content item slots 303, 304, 305, 306, and 307 and variable content item slot 308 and include variable content item slots having multiple data levels. In one or more embodiments, linked containers 301 and 302 share a common set of static and variable content items and generate pairs of documents with related data. For example, in the embodiment of FIG. 3, container 301 defines the layout and appearance of a first page of a custom school photograph, and container 302 defines the layout and appearance of a second page of a custom school photograph. In one or more embodiments, the documents generated with containers 301 and 302 may be printed on opposite sides of a single page. In the embodiment of FIG. 3, the documents generated with containers 301 and 302 may be folded along dashed line 303 to form a card or booklet.

In one or more embodiments, linked containers may define the layout and appearance of other types of documents, such as identification cards, report cards, photo books or booklets, brochures, or other types of documents. In one or more embodiments, there may be an unlimited number of linked containers that share a common set of static and variable content items (including multiple levels of variable content items) and generate sets of documents with related data.

In the embodiment of FIG. 3, static content item slot 304 is a placeholder for a digital image, which may, for example, be a photograph of the school building. Static content item slots 305 and 306 are placeholders for text, which may, for example, be the identifying information such as the name, address, phone number, web site, or email address of the school. Static content item slot 307 is a placeholder for text, which may, for example, be a label or heading, such as "My Classmates and Teachers". Content item slots 303, 304, 305, 306, and 307 are static content item slots because the school photograph and text appear unchanged in each custom school photograph generated by the invention.

In the embodiment of FIG. 3, variable content item slot 308 is a placeholder for a digital image, which may, for example, be a group photograph of the students in the class or section. Content item slot 308 is a variable content item slot because the group photograph may change from one set of custom school photographs to the next. In the embodiment of FIG. 3, slot 308 is assigned to the "section" data level because the content of that slot remains the same for each customized school picture in the same section but changes from one section to the next. For example, slot 308 may show the same group photograph for all the custom school photographs in the same class and section, but may show a different group photograph for all the custom school photographs in a different class or section.

In one or more embodiments, a document editing user interface is provided that allows a user to define the layout and appearance of containers 101, 201, 301, and 302. The document editing user interface may include a graphical user interface similar to that used in desktop publishing, presentation, or word processing software. For example, in one or more embodiments, the user may add content item slots to containers 101, 201, 301, and/or 302 and arrange content item slots in containers 101, 201, 301, and 302 by dragging and dropping, and may optionally assign each content item slot a unique name, number, or other identifier, as well as assign the content item slot to a particular data level in the hierarchy. In one or more embodiments, the user may link or group related content item slots together so that they behave as a unit when the user moves or resizes the slots. For example, a variable content item slot 106 that represents a student's picture may be linked with a variable content item slot 107 that represents the name of that student such that those variable content item slots 106 and 107 maintain a fixed position relative to each other as one slot or the other is moved to a different position in containers 101, 201, 301, and/or 302. In one or more embodiments, the user may edit other attributes of containers 101, 201, 301, and/or 302, such as dimensions and/or image resolution, background colors or images, foreground text color and font style, and colors and/or styles of borders surrounding the container or content items, among others. In one or more embodiments, the document editing user interface may provide a collaboration feature to allow multiple users to edit the same set of containers, either serially or concurrently, using multiple separate computer systems connected via a network or other method of communication.

In one or more embodiments, the document editing user interface allows the user to associate a container or a content item slot with a column in a database table to provide a source for the data that appears in that container or slot, as described in more detail below. In one or more embodiments, when content item slots are linked or grouped as described above, the linked content item slots are populated with content items in the same row of the database table. For example, if a variable content item slot 106 is associated with a column called student_photo that stores the student's photograph, the adjacent variable content item slot 107 is associated with a column called student_name that stores the student's name, and those slots 106 and 107 are linked, then those slots 106 and 107 will be populated with the data from the student_photo and student_name columns from the same row in the table. This allows the user to ensure that related content items, such as a student's name and photograph, always appear together. In the above example, this allows the user to ensure that a student's name does not appear under a photo of a different student.

In one or more embodiments, a selection of predesigned containers may be provided for immediate use. Predesigned containers may define multiple data levels and may be linked together as described above.

Figure 4:
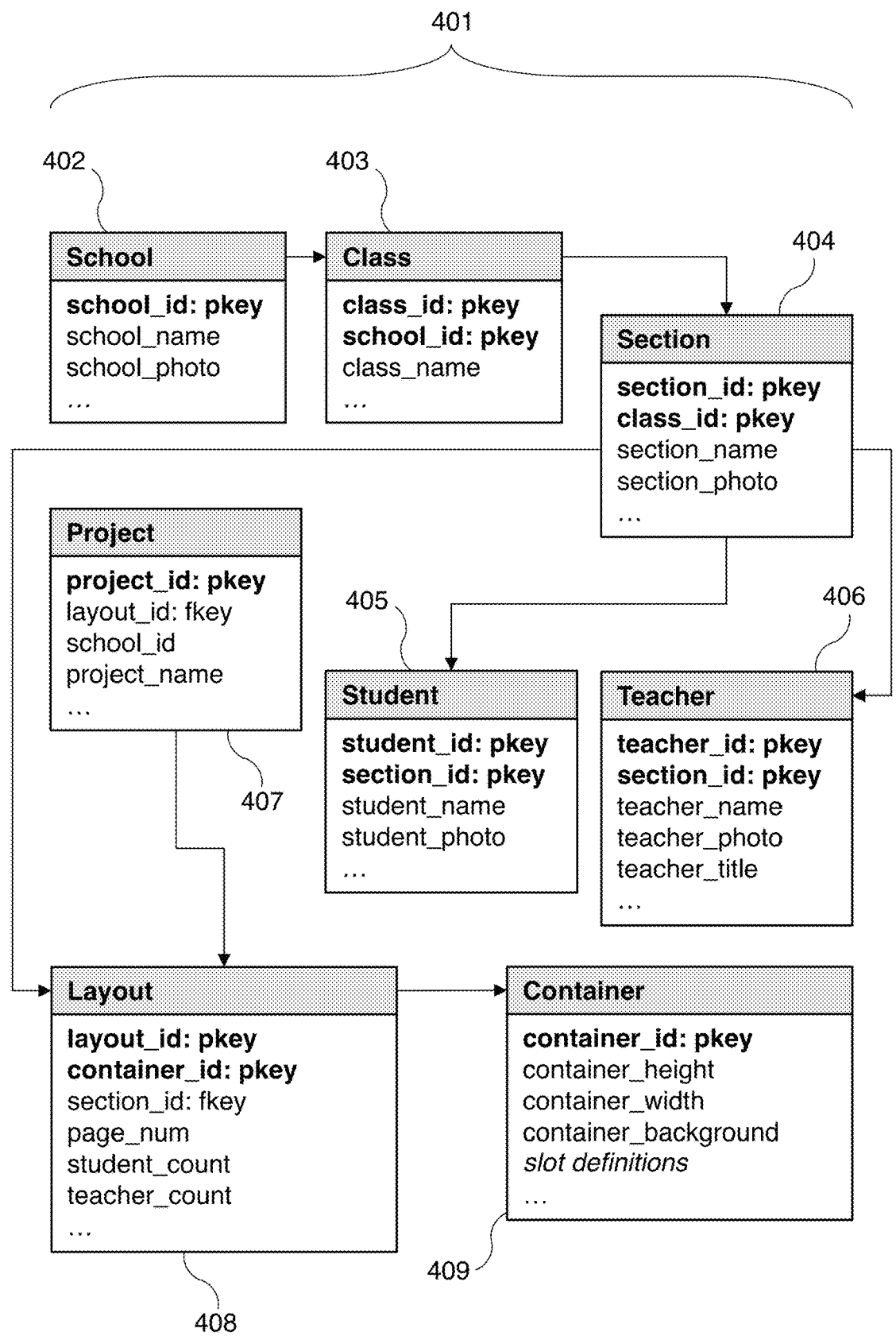
FIG. 4 is a relational database schema according to an embodiment of the present invention.

FIG. 4 shows a relational database schema 401 according to an embodiment of the present invention. In the embodiment of FIG. 4, schema 401 relates to data used to generate custom school photographs and includes tables 402, 403, 404, 405, 406, 407, 408, and 409. In the embodiment of FIG. 4, schema 401 defines a hierarchy of at least three data levels: "Class", "Section", and "Student". Each table stores data that is used by the method and apparatus of the present invention to generate documents by populating the content item slots of a container with content items. In one or more embodiments, each container or content item is stored as one or more rows in one or more of tables 402, 403, 404, 405, 406, 407, 408, and 409.

In the embodiment of FIG. 4, School table 402 represents data relating to one or more schools. School table 402 includes a school_id column, which is the primary key used to uniquely identify each row in the table. The data type of school_id may be a number or a sequence of alphanumeric characters, and may be automatically generated, or may alternatively be chosen by the user. School table 402 further includes school_name and school_photo columns. The data type of school_name may be a character string and is used to store the name of the school (for example, "Bangalore International Public School") as it appears in the custom school photographs generated by the invention (for example, in slot 103 of container 101 or 201). The data type of school_photo may be an image stored directly in the database, or may be a character string representing a filesystem path, URL, or other pointer to an externally-stored image, and is used to store a photograph of the school or an image of the school's logo as it appears in the custom school photographs generated by the invention (for example, in slot 102 of container 101, 201, 301, or 302, or slot 304 of container 301).

In the embodiment of FIG. 4, Class table 403 represents data relating to one or more classes (or grades, levels, etc.) in a school and represents the "Class" data level. Class table 403 includes class_id and school_id columns, which together are the primary key used to uniquely identify each row in the table and to associate a particular class with a school. The data types of both class_id and school_id may be a number or a sequence of alphanumeric characters, and may be automatically generated, or may alternatively be chosen by the user. Class table 403 further includes a class_name column. The data type of class_name may be a character string and is used to store the name of the class (for example, "Grade", or "Prep", or "Level") as it appears in the custom school photographs generated by the invention (for example, in slot 204 of container 201 or 301).

In the embodiment of FIG. 4, Section table 404 represents data relating to one or more sections in a class and represents the "Section" data level. Section table 404 includes section_id and class_id columns, which together are the primary key used to uniquely identify each row in the table and to associate a particular section with a class. The data types of both section_id and class_id may be a number or a sequence of alphanumeric characters, and may be automatically generated, or may alternatively be chosen by the user. Section table 404 further includes section_name and section_photo columns. The data type of section_name may be a character string and is used to store the name of the section (for example, "3", or "III", or "C") as it appears in the custom school photographs generated by the invention (for example, in slot 205 of container 201 or 301). The data type of section_photo may be an image stored directly in the database, or may be a character string representing a filesystem path, URL, or other pointer to an externally-stored image, and may be used to store a group photograph of the students in the section as it appears in the custom school photographs generated by the invention (for example, in slot 308 of container 302).

In the embodiment of FIG. 4, Student table 405 represents data relating to one or more students in a section and represents the "Student" data level. Student table 405 includes student_id and section_id columns, which together are the primary key used to uniquely identify each row in the table and to associate a particular student with a section. The data types of both student_id and section_id may be a number or a sequence of alphanumeric characters, and may be automatically generated, or may alternatively be chosen by the user. Student table 405 further includes student_name and student_photo columns. The data type of student_name may be a character string and is used to store the name of the student as it appears in the custom school photographs generated by the invention (for example, in slots 105 or 107 of containers 101, 201, 301, or 302). The data type of student_photo may be an image stored directly in the database, or may be a character string representing a filesystem path, URL, or other pointer to an externally-stored image, and may be used to store a photograph of the student as it appears in the custom school photographs generated by the invention (for example, in slots 104 or 106 of containers 101, 201, 301, or 302).

In the embodiment of FIG. 4, Teacher table 406 represents data relating to one or more teachers or other school officials in a section. Teacher table 406 includes teacher_id and section_id columns, which together are the primary key used to uniquely identify each row in the table and to associate a particular teacher with a section. The data types of both teacher_id and section_id may be a number or a sequence of alphanumeric characters, and may be automatically generated, or may alternatively be chosen by the user. Teacher table 406 further includes teacher_name, teacher_photo, and teacher_title columns. The data type of teacher_name may be a character string and is used to store the name of the section teacher as it appears in the custom school photographs generated by the invention (for example, in slot 206 of containers 101, 201, or 302). The data type of teacher_photo may be an image stored directly in the database, or may be a character string representing a filesystem path, URL, or other pointer to an externally-stored image, and may be used to store a photograph of the section teacher as it appears in the custom school photographs generated by the invention (for example, in slot 205 of containers 101, 201, or 302). The data type of teacher_title may be a character string and is used to store the title of the section teacher or other school official (for example, "Teacher", or "Assistant Teacher", or "Principal") as it appears in the custom school photographs generated by the invention (for example, in slot 207 of containers 101, 201, or 302).

In the embodiment of FIG. 4, Project table 407 represents data relating to one or more projects. Each project represents a particular configuration (or "layout") of containers used to generate sets of customized documents. Project table 407 includes a project_id column, which is the primary key used to uniquely identify each row in the table. The data type of project_id may be a number or a sequence of alphanumeric characters, and may be automatically generated, or may alternatively be chosen by the user. Project table 407 also includes a layout_id column, which is a foreign key that refers to the corresponding column in table 408 and is used to associate a particular project with a layout. The data type of layout_id may be a number or a sequence of alphanumeric characters, and may be automatically generated, or may alternatively be chosen by the user. Project table 407 further includes a school_id column, which is used to associate a particular project with a school. The data type of school_id may be a number or a sequence of alphanumeric characters, and may be automatically generated, or may alternatively be chosen by the user.

In the embodiment of FIG. 4, Layout table 408 represents data relating to one or more layouts. Each layout represents a set of linked containers used to generate sets of customized documents. Layout table 408 includes layout_id and container_id columns, which together are the primary key used to uniquely identify each row in the table and to associate a particular container with a layout. The data types of each of layout_id and container_id may be a number or a sequence of alphanumeric characters, and may be automatically generated, or may alternatively be chosen by the user. Layout table 408 also includes a section_id column, which is a foreign key that refers to the corresponding column in table 404 and is used to associate a particular layout with a section. The data type of section_id may be a number or a sequence of alphanumeric characters, and may be automatically generated, or may alternatively be chosen by the user. Layout table 408 further includes page_num, student_count, and teacher_count columns. The data type of page_num may be a number and is used to store the page number or sequence number of the particular container in the layout (for example, in a layout with two containers, such as containers 301 and 302, the first container may be "1" to indicate that it is the first page, and the second container may be "2" to indicate that it is the second page). The data types of each of student_count and teacher_count may be a number and are used to store the number of student variable data item slots and teacher variable data item slots, respectively, that appear in the layout.

In the embodiment of FIG. 4, Container table 409 represents data relating to one or more containers. Container table 409 includes a container_id column, which is the primary key used to uniquely identify each row in the table. The data type of container_id may be a number or a sequence of alphanumeric characters, and may be automatically generated, or may alternatively be chosen by the user. Container table further includes container_height, container_width, and container_background columns, as well as additional columns defining the configuration of slots in the container. The data type of each of container_height and container_width may be a number and are used to store the dimensions of the container. The data type of container_background may be an image stored directly in the database, or may be a character string representing a color, or a filesystem path, URL, or other pointer to an externally-stored image, and may be used to store a background image or color as it appears in the custom school photographs generated by the invention. Finally, one or more columns may be used to define the sizes, positions, data, and other information relating to the slots in the container. If the maximum number of slots that may appear in a container is known or defined in advance (for example, a maximum of 30 slots), a set of columns slot1_height, slot1_width, slot1_x_position, slot1_y_position, slot1_data, . . . , slot30_name, slot30_type, slot30_data may be defined in the table. Alternatively, "flexible tables" may be used to accommodate variable and potentially unlimited numbers of slots, as described below.

In one or more embodiments, tables 402, 403, 404, 405, 406, 407, 408, and 409 may include additional columns to store additional items of data that may appear in the custom school photographs generated by the invention, or as otherwise required by a particular implementation of the invention (for example, a student's date of birth or other information). Furthermore, in one or more embodiments, tables 402, 403, 404, 405, 406, 407, 408, and/or 409 may include extensible, user-defined columns to accommodate variable numbers of certain types of data. These tables with user-defined columns are referred to as "flexible tables". For example, a school may have twenty class sections, each having between one to three group photographs. To accommodate this situation with ordinary relational database tables, Section table 404 would require three separate sets of section_photo columns (e.g., section_photo1, section_photo2, and section_photo3) and would have to permit some of those columns to have null values if there are fewer than three photographs for a particular section. With flexible tables, Section table 404 may instead implement a user-defined "flexible column" using a 3-tuple of columns to store the name, data type, and data for the flexible column. For example, Section table 404 may define cvarlabel, cvartype, and cvardata columns, each having a data type of character string. The cvarlabel column stores the name of the flexible column (for example, "PHOTO1" or "PHOTO2"). The cvartype column stores the data type of the flexible column (for example, "IMAGE"). The cvardata column stores the data contained in the flexible column. Thus, instead of defining a fixed set of columns that must be present in every row whether or not data exists for that row, flexible tables allow the use of 3-tuples in the form of (key, type, value) to store data in the table in an unlimited number of user-defined columns.

In one or more embodiments, one or more data files called "data reception templates" may be used to facilitate the loading of data into one or more of the tables defined by database schema 401. A data reception template is a file in tabular format (for example, a spreadsheet in comma-separated value ["CSV"] or Microsoft Excel format) which is automatically generated by the invention in accordance with the structure of database schema 401 and which provides blank spaces for the user to enter data for import into the database. In one or more embodiments, each data reception template corresponds to the data stored in a particular data level in the data level hierarchy. In one or more embodiments, each data reception template includes a header row that contains some or all of the columns of the corresponding table in database schema 401, including the columns that establish relationships between data levels (such as section_id, which appears in both the "Section" and "Student" tables and establishes a relationship between each student and the section that the student is a part of). For example, in the embodiment of FIG. 4, the invention may automatically generate data reception templates for the "Class", "Section", and "Student" levels. An example blank data reception template generated by the invention for the "Student" level may appear as follows:

TABLE 1

Example blank data reception template

| Student ID | Section ID | Student Name | Student Photo |
| --- | --- | --- | --- |

The same data reception template with data entered by the user may appear as follows:

TABLE 2

Example data reception template with data entered by user

| Student ID | Section ID | Student Name | Student Photo |
| --- | --- | --- | --- |
| 101 | A | Priyanka Tejas | ptejas.jpg |
| 102 | A | Joshua Benjamin | jbenjamin.jpg |
| 103 | B | Adrith Chandrasekhar | achandrasekhar.jpg |

While FIG. 4 shows one possible database schema, other data storage arrangements are possible. For example, data may be stored in other types of database management systems, such as an object-oriented database, a hierarchical database, a flat file database, or a key-value database. Alternatively, data may be stored in a computer filesystem without the use of a database management system, or as unstructured data, or any in other type of data storage and retrieval system. Further, in one or more embodiments, a collaboration feature may be provided to allow multiple users to enter and upload data, either serially or concurrently, using multiple separate computer systems connected via a network or other method of communication.

Figure 5:
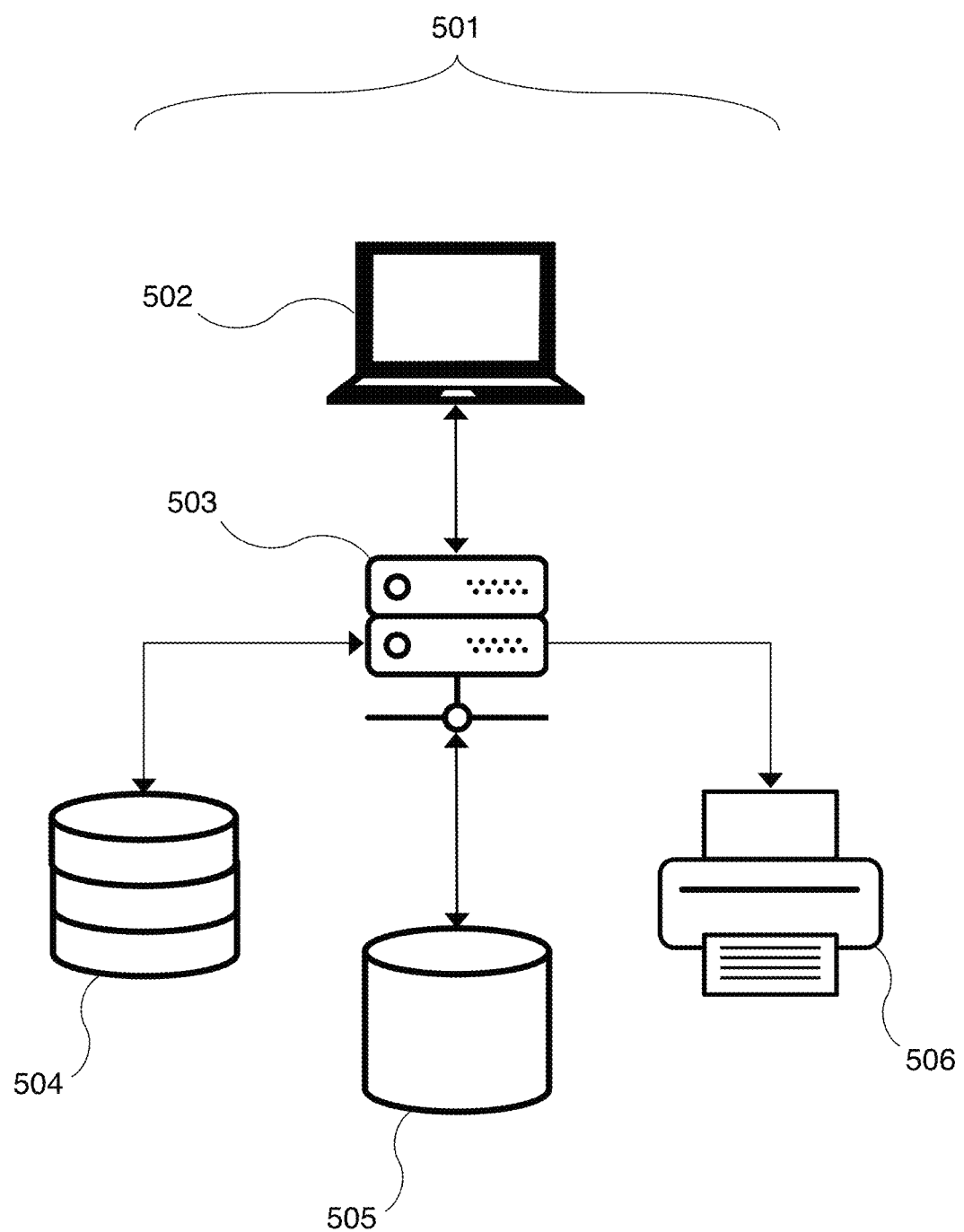
FIG. 5 is a block diagram of a computer system for generating composite documents according to an embodiment of the present invention.

FIG. 5 is a block diagram of a system 501 for generating composite documents according to an embodiment of the present invention. In the embodiment of FIG. 5, system 501 includes front-end system 502, back-end server 503, database 504, storage 505, and printer 506. In one or more embodiments, front-end system 502, back-end server 503, database 504, storage 505, or any combination thereof may be applications running on a single computer system, or may alternatively be implemented as applications running on two or more separate computer systems connected via a computer network, shared memory or storage, or other method of communication between computer systems. In one or more embodiments, any of the computer systems may be a desktop or laptop computer, tablet computer, mobile phone, set-top box, or any other type of computer having a processor and memory.

In the embodiment of FIG. 5, front-end system 502 provides a document editing user interface that allows a user to define the layout and appearance of containers as described above with reference to FIGS. 1, 2, and 3. In one or more embodiments, front-end system 502 may also provide a database management system user interface that allows a user to define tables and data relations as described above with reference to FIG. 4 and to load data into database 504 using data reception templates generated by system 501. In one or more embodiments, front-end system 502 may also provide a document generation user interface that allows a user to generate customized documents using the containers and data as described in more detail below with reference to FIGS. 6 and 7. In one or more embodiments, the document editing user interface, database management system user interface, and/or document generation user interface may be implemented as web-based applications usable through a web browser, or may alternatively be implemented as stand-alone application programs that run on front-end system 502. Further, in one or more embodiments, a collaboration feature may be provided to allow multiple front-end systems 502 to be used with system 501, either serially or concurrently.

In the embodiment of FIG. 5, front-end system 502 communicates with back-end server 503. Back-end server 503 provides the application logic that generates customized documents as described in more detail below with reference to FIGS. 6 and 7. Back-end server 503 communicates with database 504, which stores information relating to the containers as described above with reference to FIGS. 1, 2, and 3, as well as the tables, data relations, and data as described above with reference to FIG. 4. Back-end server 503 also communicates with storage 505, which may be a disk or memory storage device on the same computer as back-end server 503, or a disk or memory storage device on a separate computer, or cloud storage accessible over a local network or the Internet, or any other method of data storage. In one or more embodiments, the customized documents that are generated by system 501 are stored in storage 505 for later delivery to the user (for example, by direct file transfer, an email attachment, a web link, or any other method of digital document delivery). Back-end server 503 further communicates with printer 506. In one or more embodiments, hard copies of the customized documents that are generated by system 501 are printed on printer 506.

In one or more embodiments, the functionality of back-end server 503 may be collectively implemented by more than one computer system. For example, back-end server 503 may be implemented by or virtualized on a cluster of computer systems to provide additional computing power and/or reliability. In one or more embodiments, the computer systems that collectively implement the functionality of back-end server 503 may be arranged in a tiered or hierarchical configuration. For example, a first-tier computer system connected to front-end system 502 may provide a web interface and related application logic, a second-tier computer system connected to the first-tier computer system may provide the document-generation logic, and a third-tier computer system connected to the second-tier computer system may provide database 504, storage 505, and printer 506.

Figure 6:
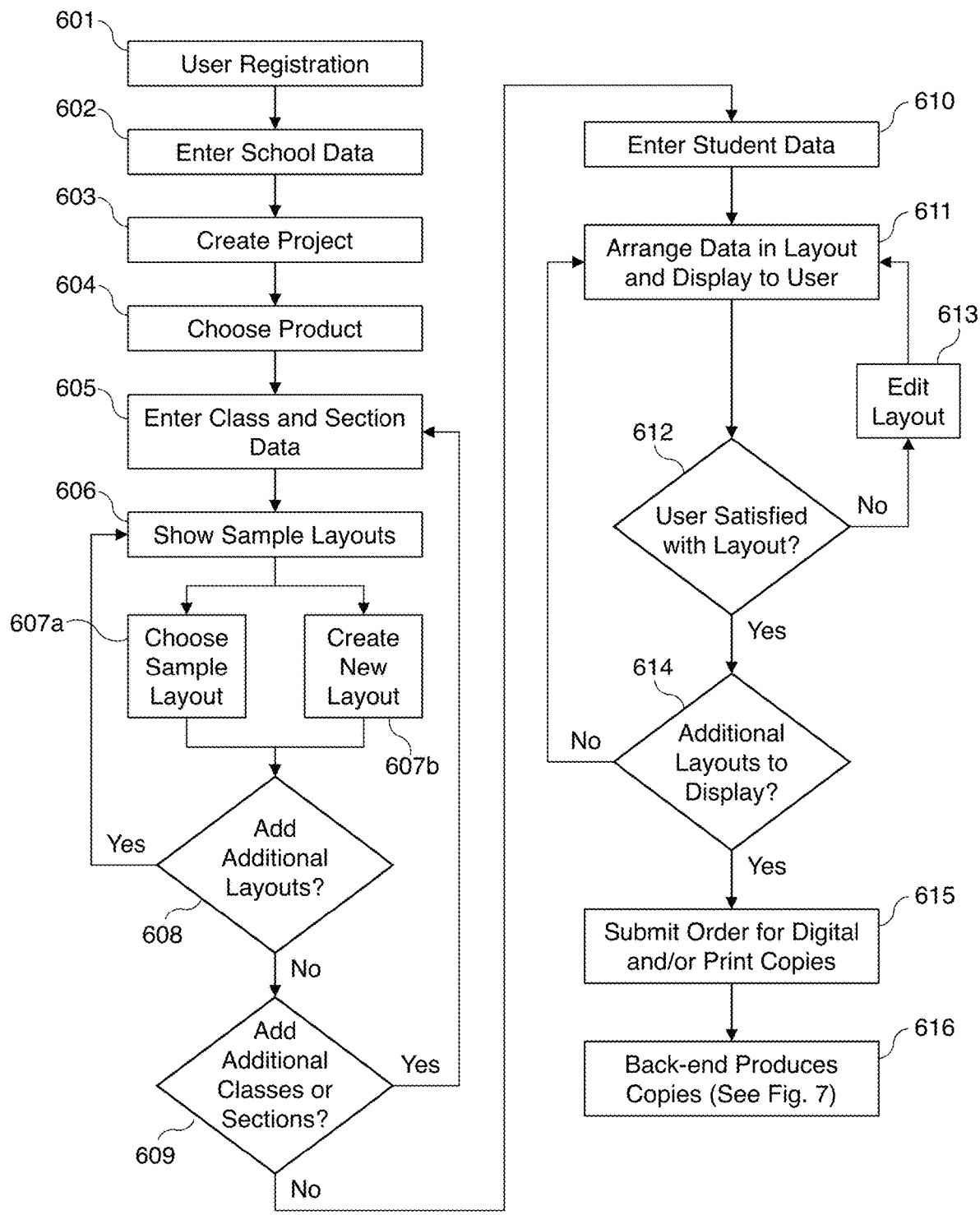
FIG. 6 is a flow chart illustrating the front-end processing steps used to generate composite documents according to an embodiment of the present invention.

FIG. 6 is a flow chart illustrating the front-end processing steps used by a system (such as system 501) to generate composite documents (in this case, custom school photographs) according to an embodiment of the present invention. The control flow begins at step 601. At step 601, a new user registers a user account on a front-end web application (for example, front-end system 502). In one or more embodiments, the front-end web application may communicate with a back-end system (such as back-end server 503) to perform part or all of the data processing in steps 601 through 616, and to store data, for example in database 504. In one or more embodiments, the user may choose a login user name and password, or alternatively, the front-end web application may automatically generate a user name, password, or both for the user. In one or more embodiments, the user may enter additional account details to facilitate ordering copies of generated documents, such as the user's name, postal address, email address, phone number, or other contact information, as well as one or more credit card numbers or other payment details. In one or more embodiments, the account information is stored in one or more tables in database 504 for later use.

From step 601, the control flow continues to step 602. At step 602, the user enters data relating to the school. In one or more embodiments, the school data may include the school's name, address, phone number, email address, one or more logos or other graphics, one or more photographs of the school, names and photographs of the school principal, assistant principal, or other school officials, or other data relating to the school. In one or more embodiments, the school data is stored in one or more tables, such as School table 402, in database 504 for later use.

From step 602, the control flow continues to step 603. At step 603, the user creates a new project, which represents a particular configuration of settings used to generate one or more customized documents. In one or more embodiments, the user may enter data relating to the project, such as a project name and comments that the user may later use to identify the project. In one or more embodiments, the project data is stored in one or more tables, such as Project table 407, in database 504 for later use.

From step 603, the control flow continues to step 604. At step 604, the user chooses a product for the new project, which represents a particular type of customized document that will be generated. For example, in one or more embodiments, the product may be a set of printed photographs, or may instead be a set of digital image files. In one or more embodiments, the product data is stored in one or more tables, such as Layout table 408, in a database for later use.

From step 604, the control flow continues to step 605. At step 605, the user enters data relating to a particular class and section in the school. In one or more embodiments, system 501 generates one or more data reception templates for the "Class" and "Section" data levels as described above with reference to Tables 1 and 2. In one or more embodiments, the class data (which is assigned to the "Class" data level) may include the class name, and the section data (which is assigned to the "Section" data level) may include the section name, the names and photographs of the teachers in the section, and one or more group photographs of the students and teachers in a section. In one or more embodiments, the user enters the class and section data into the corresponding data reception templates and submits or uploads the data reception templates to system 501 for loading into database 504. In one or more embodiments, the class, section, and teacher data is stored in one or more tables, such as Class table 403, Section table 404 and Teacher table 406, in database 504 for later use.

From step 605, the control flow continues to step 606. At step 606, one or more sample layouts are presented to the user. In one or more embodiments, sample layouts are layouts (having one or more containers) that have already been designed, either by the user or third parties, and which may be used as-is, or may be further customized by the user.

From step 606, the control flow continues to either step 607*a* or step 607*b*. At step 607*a*, the user chooses one of the sample layouts for use in the project. In one or more embodiments, the user may optionally edit the sample layout (including any or all of the containers in the layout) using the document editing user interface described above. Alternatively, at step 607*b*, the user creates a new, custom layout using the document editing user interface described above. In one or more embodiments, the layout and container information is stored in one or more tables, such as Layout table 408 and Container table 409, in database 504 for later use.

From step 607*a* or step 607*b*, the control flow continues to step 608. At step 608, the user has the option of adding additional layouts to the current class and section. If the user chooses to add additional layouts to the current class and section, the control flow returns to step 606. Otherwise, the control flow continues to step 609.

At step 609, the user has the option of adding additional classes and sections to the current project. If the user chooses to add additional classes and/or sections to the current project, the control flow returns to step 605. Otherwise, the control flow continues to step 610.

At step 610, the user enters data relating to the students in the current class and section. In one or more embodiments, system 501 generates a data reception template for the "Student" data level as described above with reference to Tables 1 and 2. In one or more embodiments, the student data (which is assigned to the "Student" data level) may include each student's name and photograph. In one or more embodiments, the user enters the student data into the data reception template and submits or uploads the data reception template to system 501 for loading into database 504. In one or more embodiments, the student data is stored in one or more tables, such as Student table 405, in database 504 for later use.

From step 610, the control flow continues to step 611. At step 611, the data entered by the user in the previous steps is arranged in the selected layout and a sample document is displayed to the user. In one or more embodiments, the sample document allows the user to review the appearance of the finished copies generated by the method described below with reference to FIG. 7. In one or more embodiments, the sample document may be generated using the same or a similar method to that described below with reference to FIG. 7.

From step 611, the control flow continues to step 612. At step 612, the user reviews the sample document and has the option of making further changes to the layout. If the user chooses to make further changes, the control flow continues to step 613. Otherwise, the control flow continues to step 614.

At step 613, the user edits the layout using the document editing user interface described above. When the user is finished editing the layout, the control flow returns to step 612.

At step 614, if there are additional layouts in the project that have not yet been displayed to the user (whether in the current class and section, a different section in the same class, or a different class), the control flow returns to step 611 to display the one or more additional layouts. Otherwise, the control flow continues to step 615.

At step 615, the user has reviewed and approved all the layouts in the project and submits an order for digital and print copies of the final generated documents. In one or more embodiments, the user may specify further options for any digital copies, such as resolution, color depth, image format, compression or quality level, or other such options. In one or more embodiments, the user may specify further options for any print copies, such as number of copies, physical dimensions, print quality, paper type, binding options, or other such options. In one or more embodiments, the order data is stored in one or more tables in database 504 for later use.

From step 615, the control flow continues to step 616. At step 616, a back-end application (such as an application running on back-end server 503) produces a set of digital and/or print documents for the user, for example in accordance with the method described below with reference to FIG. 7.

Figure 7:
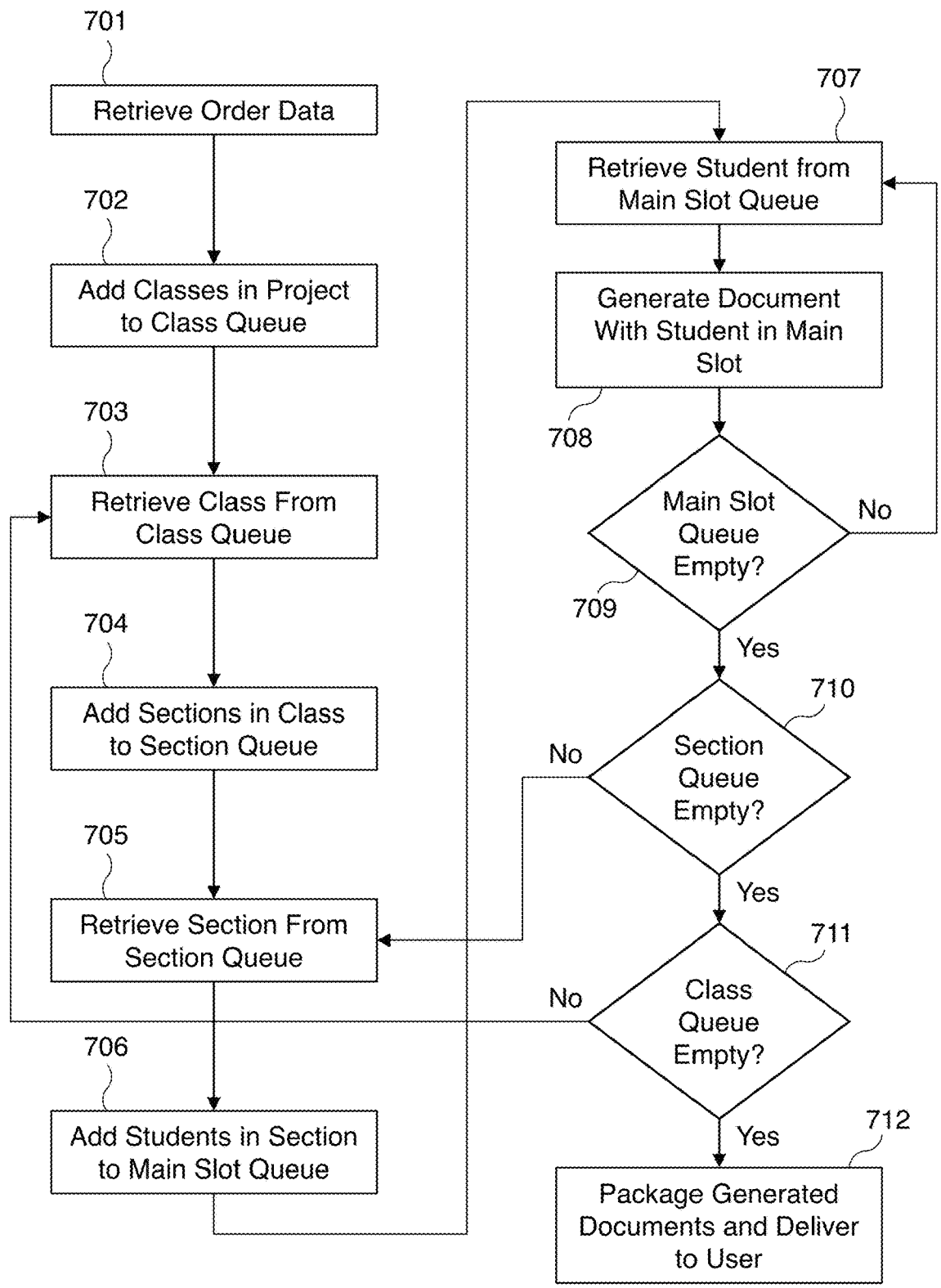
FIG. 7 is a flow chart illustrating the back-end processing steps used to generate composite documents according to an embodiment of the present invention.

FIG. 7 is a flow chart illustrating the back-end processing steps used by a back-end application (such as an application running on back-end server 503 of system 501) to generate composite documents (in this case, custom school photographs) according to an embodiment of the present invention. The control flow begins at step 701. At step 701, the back-end application retrieves the order and project data from one or more tables in database 504.

From step 701, the control flow continues to step 702. At step 702, processing of the "Class" data level begins. The back-end application retrieves the set of classes in the current project from one or more tables, such as Class table 403, in database 504, and adds the classes to a class queue so that each class may be processed in turn. From step 702, the control flow continues to step 703. At step 703, the back-end application retrieves a class from the class queue and removes the class from the queue.

From step 703, the control flow continues to step 704. At step 704, processing of the "Section" data level begins. The back-end application retrieves the set of sections in the current class from one or more tables, such as Section table 404, in database 504, and adds the sections to a section queue so that each section in the class may be processed in turn. From step 704, the control flow continues to step 705. At step 705, the back-end application retrieves a section from the section queue and removes the section from the queue.

From step 705, the control flow continues to step 706. At step 706, processing of the "Student" data level begins. The back-end application retrieves the set of students in the current section from one or more tables, such as Student table 405, in database 504, and adds the students to a main slot queue so that a document may be generated in turn for each student in the section. From step 706, the control flow continues to step 707. At step 707, the back-end application retrieves a student from the main slot queue and removes the student from the queue.

From step 707, the control flow continues to step 708. At step 708, the back-end application retrieves the current student's name and photograph from one or more tables, such as Student table 405, in database 504, and generates a document with the current student's name and photograph in the "main" variable content item slot or slots (for example, variable content item slots 104 and 105). The back-end application further retrieves additional data to populate the content item slots of the document, such as the names and photographs of the other students in the section, the names and photographs of the section teachers or other school officials, the name of the class and section, the name and logo of the school, any other photographs of the school or section, and any other such data, from one or more tables in database 504. In one or more embodiments, the generated document is stored as a digital file on back-end server 503, in database 504, or in another storage medium.

From step 708, the control flow continues to step 709. At step 709, if the main slot queue is empty, the control flow continues to step 710. Otherwise, the control flow returns to step 707 to generate additional documents for the remaining students in the current section. At step 710, if the section queue is empty, the control flow continues to step 711. Otherwise, the control flow returns to step 705 to generate additional documents for the remaining sections in the current class. At step 711, if the class queue is empty, the control flow continues to step 712. Otherwise, the control flow returns to step 703 to generate additional documents for the remaining classes in the current project.

At step 712, the back-end application packages the set of generated documents for the user's order and delivers the documents to the user. In one or more embodiments, if the user has ordered digital copies of the documents, the back-end application collects the digital copies of the generated documents (for example, into a folder or a compressed archive file) and delivers the collection of documents to the user via direct file transfer, an email attachment, a link to a web server hosting the documents, or any other method of digital document delivery. In one or more embodiments, if the user has ordered print copies of the documents, the back-end application prints the digital copies of the generated documents (for example, with printer 506) for physical delivery to the user by mail, courier, or any other method of physical document delivery.

Figure 8:
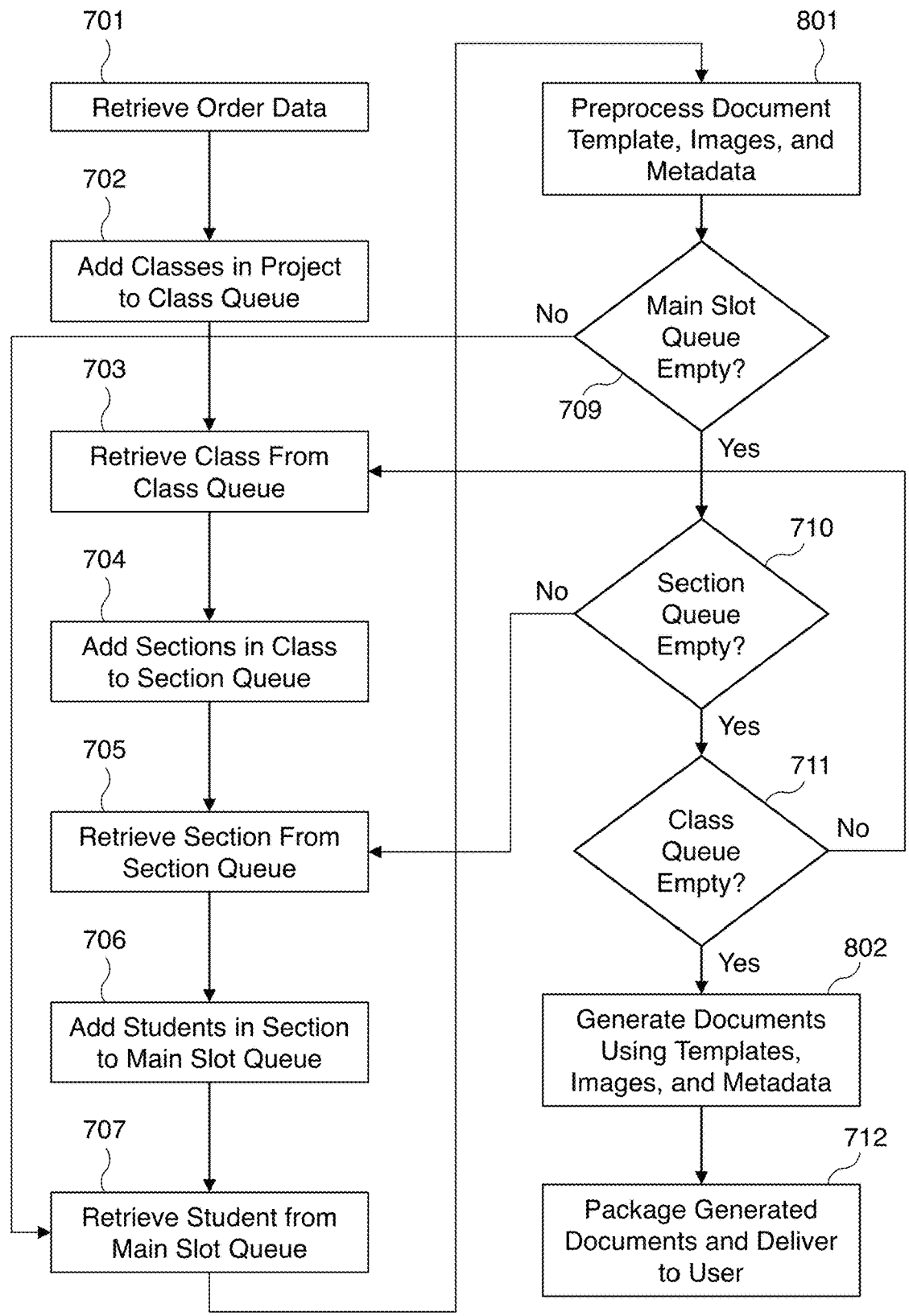
FIG. 8 is a flow chart illustrating the back-end processing steps used to generate composite documents according to an embodiment of the present invention.

FIG. 8 is a flow chart illustrating the back-end processing steps used by a back-end application (such as an application running on back-end server 503 of system 501) to generate composite documents (in this case, custom school photographs) according to an embodiment of the present invention. The embodiment of FIG. 8 is similar to the embodiment of FIG. 7, except that the document generation step is split into a preprocessing step 801 to "flatten" the hierarchical structure of data levels by producing a template, set of images, and metadata for each document to be generated, followed by a document generation step 802 after all such templates, images, and metadata have been preprocessed.

The control flow proceeds from step 701 through step 707 as described above with reference to FIG. 7. From step 707, the control flow continues to step 801. At step 801, the back-end application retrieves the current student's name and photograph, along with additional data to populate the content item slots of the document, such as the names and photographs of the other students in the section, the names and photographs of the section teachers or other school officials, the name of the class and section, the name and logo of the school, any other photographs of the school or section, and any other such data, from one or more tables in database 504. The back-end application then generates a template file (for example, a digital image file with blank spaces where the slots appear), a set of metadata (for example, a CSV file containing data that defines the locations and dimensions of the images, as well as the contents, styles, and locations of the text that will appear in the document), and stores the template, metadata, and images in a temporary storage location for use in document generation step 802. In one or more embodiments, the back-end application may resize the images so that they are the correct dimensions for the slots in the template.

From step 801, the control flow continues to step 709. The control flow proceeds from step 709 to step 711 as described above with reference to FIG. 7. At step 711, if the class queue is empty, the control flow continues to step 802.

Otherwise, the control flow returns to step 703 to preprocess additional documents for the remaining classes in the current project.

At step 802, the back-end application generates each document in turn by inserting the preprocessed images and text into the corresponding template according to the accompanying metadata. In one or more embodiments, the document generation is accomplished via the scripted control of an image editing application, such as Adobe Photoshop, running on back-end server 503 or on another computer system. For example, in one or more embodiments, the back-end application starts the Photoshop application and causes Photoshop to execute a script using Photoshop's built-in scripting capabilities. The Photoshop script loads the template file (which may, for example, be an image in Photoshop PSD format), inserts the preprocessed images into the template, and renders the text in the template according to the data stored in the CSV metadata file. The Photoshop script then exports the resulting image in a display or print-ready image format, such as JPEG or TIFF, and stores the resulting image file in a temporary storage location for use in packaging and delivery step 712.

From step 802, the control flow continues to step 712. The control flow proceeds through step 712 as described above with reference to FIG. 7.

Thus, a method and apparatus for generating composite documents from document containers or templates using a set of rules to populate the containers with variable content is presented. Although the present invention has been described with respect to certain specific embodiments, it will be clear to those skilled in the art that the inventive features of the present invention are applicable to other embodiments as well, all of which are intended to fall within the scope of the present invention.

What is claimed is:

1. A system for generating customized digital documents based on a set of user preferences comprising:
    a server system configured to serve a plurality of user interfaces via a network to one or more user devices;
    a database connected to the server system, said database comprising a plurality of database tables; and
    a back-end system connected to said server system and said database;
    wherein said plurality of user interfaces comprises:
    a first user interface configured to receive one or more commands for creating a project, said project comprising a data level hierarchy comprising a plurality of linked data levels, a plurality of variable data columns, one or more static data items, and a template comprising one or more containers, wherein each said data level is associated with a database table, comprising one or more data records, selected from said plurality of database tables, wherein each said variable data column is associated with one or more of said data levels and wherein one of said data levels is designated as a main data level and each of the remaining data levels are designated as non-main data levels;
    a second user interface configured to receive one or more commands for defining one or more keys, wherein each key defines a relation between one or more of said variable data columns and one of said data levels, and wherein each key is associated with a set of data records stored in one of said database tables;
    a third user interface configured to display said one or more containers of said template and to receive one or more commands for arranging said variable data columns and static data items in a plurality of slots in said one or more containers, and associating one or more of said slots with one of said data levels;
    a fourth user interface configured to receive one or more commands for designating one or more of said slots that are associated with said main data level as main slots and designating one or more of said slots that are associated with said main data level as alternate slots, wherein said main slots are visually distinct from said alternate slots, and wherein the total number of main slots and alternate slots equals the total number of said data records in said database table that are associated with one of said keys;
    a fifth user interface configured to display a plurality of predefined projects comprising a plurality of predefined templates, predefined data levels comprising a main data level, predefined variable data columns, predefined keys, and predefined static data items, and receive a command for selecting a project from said plurality of predefined projects instead of using said project created with said first, second, third, and fourth user interfaces;
    a sixth user interface configured to display a plurality of data reception templates generated from said plurality of data levels and said plurality of variable data columns, and to receive one or more commands for entering data into said plurality of data reception templates;
    a seventh user interface configured to receive one or more commands for loading said data of said plurality of data reception templates into said plurality of database tables;
    an eighth user interface configured to display a document preview comprising said template, said set of data records retrieved from said database tables and identified by one or more of said keys, and said static data items, wherein said main slot is populated with one data record selected from said main data level of said set of data records and each of said alternate slots are populated with one of the remaining data records selected from said main data level of said set of data records;
    a ninth user interface configured to receive one or more commands for saving said project created by said first user interface as one of said predefined projects for selection by said fifth user interface; and
    wherein said back-end system is configured to generate a plurality of customized digital documents, each customized digital document comprising said template, a plurality of data records retrieved from said database tables and identified by one or more of said keys, and said static data items, wherein for each customized digital document, said main slot is populated with one data record selected in succession from said main data level of said set of data records, and wherein each of said alternate slots are populated with one of the remaining data records selected from said main data level of said set of data records.

2. The system of claim 1 wherein one or more of said variable data columns comprise character data.

3. The system of claim 1 wherein one or more of said variable data columns comprise numeric data.

4. The system of claim 1 wherein one or more of said variable data columns comprise image, audio, or video data.

5. The system of claim 1 wherein one or more of said database tables comprise flexible tables.

6. The system of claim 1 wherein said server system is configured to allow collaborative use of said plurality of user interfaces by said one or more user devices.

7. A method for generating customized digital documents based on a set of user preferences comprising the steps of:

creating a project, said project comprising a data level hierarchy comprising a plurality of linked data levels, a plurality of variable data columns, one or more static data items, and a template comprising one or more containers, wherein each said data level is associated with a database table, comprising one or more data records, selected from said plurality of database tables, wherein each said variable data column is associated with one or more of said data levels, and wherein one of said data levels is designated as a main data level and each of the remaining data levels are designated as non-main data levels;

defining one or more keys, wherein each key defines a relation between one or more of said variable data columns and one of said data levels, and wherein each key is associated with a set of data records stored in one of said database tables;

arranging said variable data columns and static data items in a plurality of slots in said one or more containers, and associating one or more of said slots with one of said data levels;

designating one or more of said slots that are associated with said main data level as main slots and designating one or more of said slots that are associated with said main data level as alternate slots, wherein said main slots are visually distinct from said alternate slots, and wherein the total number of main slots and alternate slots equals the total number of said data records in said database table that are associated with one of said keys;

generating a plurality of data reception templates from said plurality of data levels and said plurality of variable data columns;

receiving data entered into said plurality of data reception templates;

loading said data of said plurality of data reception templates into said plurality of database tables;

displaying a document preview comprising said template, said set of data records retrieved from said database tables and identified by one or more of said keys, and said static data items, wherein said main slot is populated with one data record selected from said main data level of said set of data records, and wherein each of said alternate slots are populated with one of the remaining data records selected from said main data level of said set of data records;

generating a plurality of customized digital documents, each customized digital document comprising said template, a plurality of data records retrieved from database tables and identified by one or more of said keys, and said static data items, wherein said main slot is populated with one data record selected in succession from said main data level of said set of data records, and wherein each of said alternate slots are populated with one of the remaining data records selected from said main data level of said set of data records.

8. The method of claim 7 wherein one or more of said variable data columns comprise character data.

9. The method of claim 7 wherein one or more of said variable data columns comprise numeric data.

10. The method of claim 7 wherein one or more of said variable data columns comprise image, audio, or video data.

11. The method of claim 7 wherein one or more of said database tables comprise flexible tables.

12. The method of claim 7 wherein said server system is configured to allow collaborative use of said plurality of user interfaces by said one or more user devices.

13. A method for generating customized digital documents based on a set of user preferences comprising the steps of:

selecting a project from a plurality of predefined projects, said project comprising a data level hierarchy comprising a plurality of linked data levels, a plurality of variable data columns, one or more keys, one or more static data items, and a template comprising one or more containers, wherein each said data level is associated with a database table, comprising one or more data records, selected from said plurality of database tables, wherein each said variable data column is associated with one or more of said data levels, wherein one of said data levels is designated as a main data level and each of the remaining data levels are designated as non-main data levels, wherein each said key defines a relation between one or more of said variable data columns and one of said data levels, and wherein each key is associated with a set of data records stored in one of said database tables, wherein said variable data columns and static data items are arranged in a plurality of slots in said one or more containers, wherein one or more of said slots is associated with one of said data levels, wherein one or more of said slots that are associated with said main data level are designated as main slots and one or more of said slots that are associated with said main data level are designated as alternate slots, wherein said main slots are visually distinct from said alternate slots, and wherein the total number of main slots and alternate slots equals the total number of said data records in said database table that are associated with one of said keys;

generating a plurality of data reception templates from said plurality of data levels and said plurality of variable data columns;

receiving data entered into said plurality of data reception templates;

loading said data of said plurality of data reception templates into said plurality of database tables;

displaying a document preview comprising said template, said set of data records retrieved from said database tables and identified by one or more of said keys, and said static data items, wherein said main slot is populated with one data record selected from said main data level of said set of data records, and wherein each of said alternate slots are populated with one of the remaining data records selected from said main data level of said set of data records;

generating a plurality of customized digital documents, each customized digital document comprising said template, a plurality of data records retrieved from database tables and identified by one or more of said keys, and said static data items, wherein said main slot is populated with one data record selected in succession from said main data level of said set of data records, and wherein each of said alternate slots are populated with one of the remaining data records selected from said main data level of said set plurality of data records.

14. The method of claim 13 wherein one or more of said variable data columns comprise character data.

15. The method of claim 13 wherein one or more of said variable data columns comprise image, audio, or video data.

16. The method of claim 13 wherein one or more of said database tables comprise flexible tables.

17. The method of claim 13 wherein said server system is configured to allow collaborative use of said plurality of user interfaces by said one or more user devices.

\* \* \* \* \*